Nov. 11, 1969     D. M. PEEBLES     3,477,362

RADIANT HEAT COOKING APPARATUS

Filed Dec. 20, 1967

INVENTOR
David Meade Peebles

BY
ATTORNEY

United States Patent Office 3,477,362
Patented Nov. 11, 1969

3,477,362
RADIANT HEAT COOKING APPARATUS
David Meade Peebles, 325 Marcy Ave.,
Oxon Hill, Md. 20021
Filed Dec. 20, 1967, Ser. No. 692,126
Int. Cl. A47j 43/18, 27/00
U.S. Cl. 99—441                              4 Claims

ABSTRACT OF THE DISCLOSURE

An apparatus which allows cooking over a small flame or other small heat source including means to radiate heat inwardly toward a small central cooking receptacle and to concentrate the heat upon the article or substance within the receptacle to cook the same efficiently.

Background of the invention

There has been a continuous need in the prior art for an apparatus or cooker which will allow the efficient cooking of relatively small quantities of food by campers, unmarried apartment dwellers and like individuals who generally take their meals away from home because of the difficulty of utilizing utensils which are designed only for larger amounts of food.

More specifically, there is a need for an apparatus in which a single potato, such as an Idaho potato, may be cooked or a relatively small quantity of soup or coffee cooked by utilizing only the smallest portion of the gas flame of a gas heating unit or the minimum output of an electrical unit. When conventional cooking utensils are employed with such small sources of heat, the cooking operation is unduly slow or will not take place at all due to heat being radiated away from the utensil faster than it can be supplied by the heat source.

According to the present invention, the deficiencies of the prior art are overcome and a very simplified and highly efficient cooking appliance is provided in which small quantities of food may be efficiently cooked utilizing heat sources which are economical and not wasteful.

Summary of the invention

The invention embodies an exterior receptacle whose bottom wall may be substantially open for placement over a small flame or an electrical heating element or the like. The outer receptacle includes means to facilitate centering therein a preferred number of interior concentric heat reflectors which are capable of directing heat radially inwardly toward the center of a relatively small container or receptacle for the food to be cooked. The center receptacle may include a handle for ready lifting and may also include a false bottom to elevate the food article somewhat above the direct source of heat.

Description of the preferred embodiment

Figure 1:
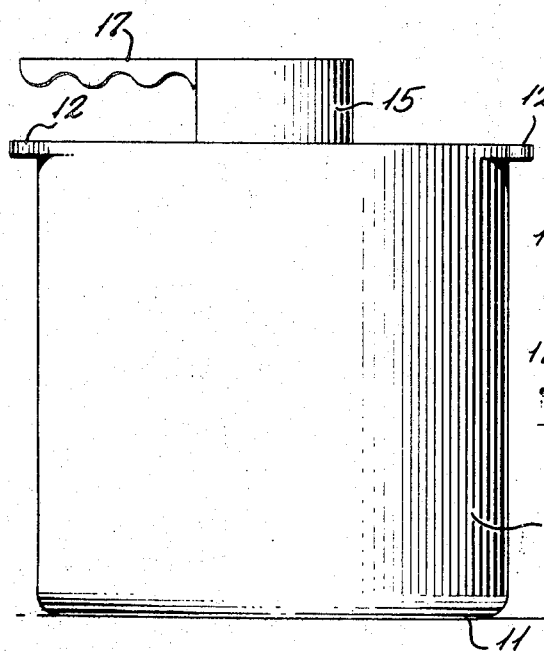
FIGURE 1 is a side elevation of a cooking apparatus embodying the invention.

Referring to the drawings, in which like numerals are employed to designate like parts, the numeral 10 designates an outer receptacle in the nature of a pot, which may be cylindrical, as shown, and being open at its top and having a flat bottom wall 11 for stability. The top of the receptacle 10 may be provided with lifting handle means 12 of any appropriate character. The bottom wall 11 has a large central opening 13 formed therethrough enabling the apparatus to be placed over a gas burner or a conventional gas range or over an electrical heating element or any convenient source of heat. The large opening 13 allows the heat source shown at 14 in the drawings to be placed in close proximity to the central cooking receptacle or container 15 which holds the food article 16, such as a potato. It may be mentioned here that the apparatus is not limited to cooking solid food articles but may be employed for cooking semi-solids and liquids, including soups, coffee and other beverages.

As shown in the drawings, the central container 15 is rather narrow in diameter and may also be cylindrical and is vertically elongated. Preferably, although not necessarily, the central receptacle projects somewhat above the top of the outer receptacle 10 and is equipped with a convenient radial lifting handle 17, preferably of heat-insulating material. The container 15 is open at the top and has a bottom wall 18, and may be provided with an elevated internal support 19 formed as a wire grid or the like a considerable distance above the bottom wall 18 for the support of a potato or like solid food article. The false bottom or support 19 may be permanent or may be removable, as found desirable.

Figure 2:
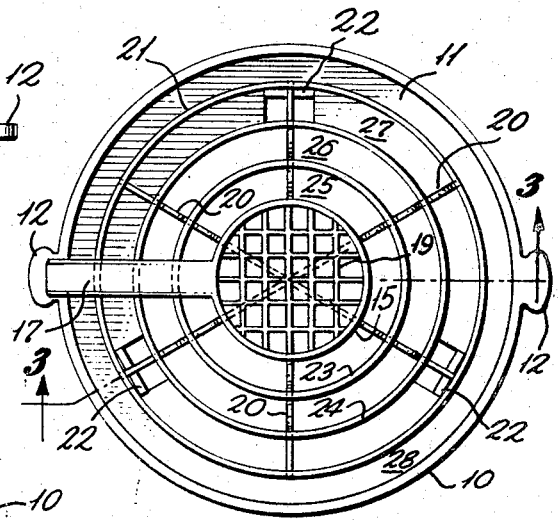
FIGURE 2 is a plan view thereof.

As shown, the central receptacle 15 rests upon a supporting wire grid 20 formed of any preferred number of intersecting wires, FIGURE 2, the outer ends of which are firmly anchored within small openings of an outermost sheet metal reflector 21 which is preferably cylindrical and whose inner face is preferably highly polished and reflective. The lower end of the outermost reflector 21 rests upon the bottom wall 11 of the outer receptacle and is maintained centered within the outer receptacle by a plurality of circumferentially spaced upturned lugs, struck from the bottom wall 11, and designated at 22.

Intermediate the central container 15 and the outer reflector 21, any desired number of additional concentric heat reflectors 23 and 24, etc. are disposed in surrounding concentric relation to the central container 15 with their bottoms resting upon and supported by the grid wires 20. Additional concentric reflectors may be employed in the apparatus, if preferred, up to any practical number, and the arrangement shown in the drawings is illustrative only, and the invention is not intended to be limited to any precise number of heat reflectors. All of the reflectors are polished on their interior faces and are capable of reflecting and radiating heat inwardly toward the center of the apparatus for concentrating the heat on the food to be cooked.

If it is desired to render the apparatus even more efficient for concentrating the heat inwardly on the food at the center of the apparatus, the outer surfaces of the reflectors 23, 24 and 21 may be blackened to facilitate absorbing heat. Also, the interior surface of the outer receptacle 10 is also preferably polished and highly reflective.

Figure 3:
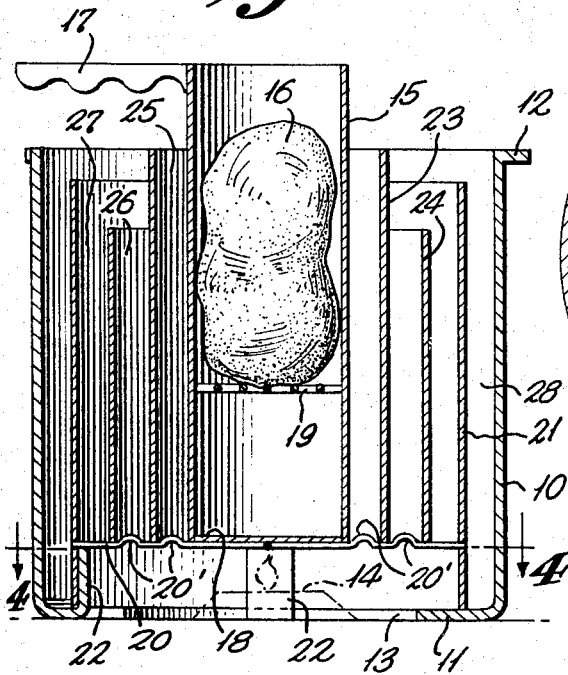
FIGURE 3 is a vertical section taken on line 3—3 of FIGURE 2.
Figure 4:
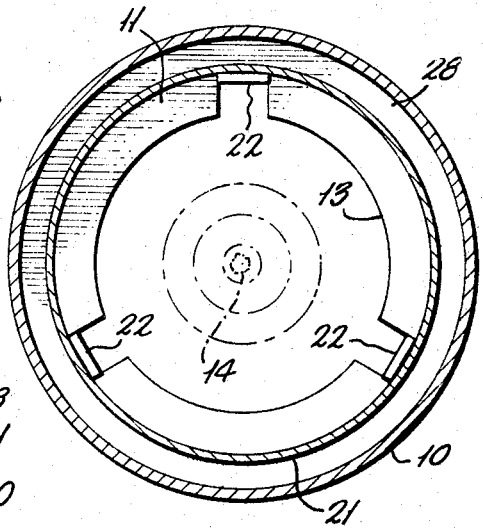
FIGURE 4 is a horizontal section taken on line 4—4 of FIGURE 3.

It should now be clear that when liquid or solid food is placed in the central relatively small and narrow container 15 and with the apparatus assembled as in FIGURE 3 and placed over a small flame or other source of heat, the heat from this flame is directed onto the bottom of the central receptacle 15 and thus gradually heats the contents of the central receptacle. At the same time, the temperature will begin to rise through out the interior of the apparatus inwardly of the outer receptacle 10 and the heat within the regions between the several concentric reflectors will be reflected radially inwardly from all points around the circumference of the reflectors toward the theoretical center of the inner container 15 as radiant energy or heat. This will aid materially in elevating the temperature in the receptacle 15 and will render the process of cooking the food therein much more efficient and rapid than would be the case if the small source of heat 14 were utilized without the reflective means.

Actual tests have been conducted with the apparatus constructed as shown in the drawings, and these tests indicate a rapid rise in temperature within the center receptacle 15 and gradually increasing annular bands of heat between the reflectors of the apparatus and between the outermost reflector 21 and outer receptacle 10. That is to say, the heat zone 25 between the reflector 23 and container 15 will be the hottest zone, while the next outermost zone 26 between reflectors 23 and 24 will be somewhat cooler and the next outermost zones 27 and 28 will be still cooler, but all of these zones will contribute their heat toward the ultimate end of cooking the food in the relatively narrow receptacle 15.

In essence, the apparatus of the invention allows utilizing a small and economical source of heat in a more efficient manner for cooking conveniently a small amount of food, for example, sufficient food for one person at one meal.

As shown in FIGURE 3, to facilitate centering the container 15 and the intermediate reflectors 23 and 24, the supporting wires 20 are preferably crimped at 20' between the reflectors and between the container 15 and the innermost reflector.

The several advantages of the invention and its economies should now be apparent to those skilled in the art, without any further description.

What is claimed is:

1. A cooking apparatus comprising an exterior container body portion which is substantially cylindrical and which has a bottom wall provided with a relatively large central opening through which a heat source may project when the apparatus is resting on said bottom wall, a relatively small and narrow food container disposed within the exterior container substantially centrally and adapted to hold a relatively small quantity of food to be cooked, a plurality of substantially concentrically arranged heat reflectors disposed between said exterior and central containers and collectively reflecting and concentrating radiant heat energy toward the center of the apparatus to aid in cooking the food in the central container, said heat reflectors being substantially cylindrical, a substantially horizontal grid element within the exterior container somewhat above said bottom wall and supporting the central food container and at least some of said heat reflectors, said grid element anchored to the outermost reflector and supported thereon, and the outermost reflector extending to said bottom wall and resting thereon, and means for substantially centering the outermost reflector in the exterior container.

2. The structure of claim 1, wherein said means for centering is a plurality of circumferentially spaced lugs within the exterior container struck upwardly from the bottom wall thereof and entering the bottom end of the outermost reflector.

3. The structure of claim 1, and means on said grid element to maintain the central food container and intermediate reflectors in substantially concentric relationship.

4. A cooking apparatus comprising an exterior container body portion having a relatively large central bottom wall opening adapted to receive a heating means, upstanding lug elements on the bottom wall of said exterior container body portion near the margin of said opening, an outermost cylindrical heat reflector within said body portion and resting on said bottom wall and engaging over said lug elements and being positioned thereby substantially concentrically with said body portion, a supporting grid secured to the outermost heat reflector above said bottom wall and lug elements and being substantially horizontal, a central relatively small and narrow food container mounted on said grid above said opening, plural intermediate substantially cylindrical heat reflectors inside of said outermost reflector and resting on said grid and surrounding said food container, and projection elements on said grid engaging said food container and intermediate heat reflectors to maintain the same in spaced substantially concentric relation with one another and with said outermost reflector.

References Cited

UNITED STATES PATENTS

| 1,399,866 | 12/1921 | Kirk et al. | 126—215 |
| 1,512,482 | 10/1924 | Patterson. | |
| 1,740,205 | 12/1929 | Schmidt. | |
| 2,364,537 | 12/1944 | Kerth | 99—418 XR |
| 2,857,634 | 10/1958 | Garbade et al. | |
| 2,912,922 | 11/1959 | Schmall | 99—401 XR |
| 3,109,360 | 11/1963 | Baume | 99—401 XR |
| 3,194,228 | 7/1965 | Bargues | 126—271 |

FOREIGN PATENTS

| 623,682 | 8/1961 | Italy. |
| 881,972 | 2/1943 | France. |

WILLIAM I. PRICE, Primary Examiner

ARTHUR O. HENDERSON, Assistant Examiner

U.S. Cl. X.R.

99—447; 126—215